United States Patent
Almy

(10) Patent No.: US 11,505,943 B2
(45) Date of Patent: Nov. 22, 2022

(54) TRUSS FOUNDATION ADAPTERS FOR SINGLE-AXIS TRACKERS

(71) Applicant: Ojjo, Inc., San Rafael, CA (US)

(72) Inventor: Charles Almy, Berkeley, CA (US)

(73) Assignee: Ojjo, Inc., San Rafael, CA (US)

( * ) Notice: Subject to any disclaimer, the term of this patent is extended or adjusted under 35 U.S.C. 154(b) by 56 days.

(21) Appl. No.: 16/920,225

(22) Filed: Jul. 2, 2020

(65) Prior Publication Data

US 2021/0002896 A1    Jan. 7, 2021

Related U.S. Application Data

(60) Provisional application No. 62/869,993, filed on Jul. 2, 2019.

(51) Int. Cl.
*E04C 3/38* (2006.01)
*E04C 3/02* (2006.01)
*E04B 1/32* (2006.01)

(52) U.S. Cl.
CPC .................. *E04C 3/38* (2013.01); *E04C 3/02* (2013.01); *E04B 2001/3241* (2013.01)

(58) Field of Classification Search
CPC .... E04C 3/38; E04C 3/02; F24S 25/13; F24S 25/617; F24S 30/45; F24S 2030/15; H02S 20/10; H02S 20/30; H02S 20/32; E04B 2001/342; E04B 2001/3241
See application file for complete search history.

(56) References Cited

U.S. PATENT DOCUMENTS

| | | | | |
|---|---|---|---|---|
| 5,125,613 A * | 6/1992 | Albee, Jr. | ............... | A47B 97/08 248/463 |
| 6,065,267 A * | 5/2000 | Fisher | ...................... | E04C 3/08 52/655.1 |
| 7,984,789 B2 * | 7/2011 | Michalec | ............... | A01M 31/02 182/115 |
| 8,317,141 B2 * | 11/2012 | Fischer | .................. | F16M 11/36 396/419 |
| 8,991,388 B2 * | 3/2015 | Brothersen | ............. | H02S 20/32 126/680 |
| 10,128,791 B2 * | 11/2018 | Ludwig | ................... | F24S 25/636 |
| 10,903,784 B2 * | 1/2021 | Hudson | ................... | H02S 20/32 |
| 2007/0272234 A1 * | 11/2007 | Allen | ..................... | F24S 25/617 126/704 |
| 2010/0139645 A1 * | 6/2010 | Whipple | ............... | F24S 30/452 126/576 |
| 2011/0192394 A1 * | 8/2011 | Brothersen | ............... | E04C 3/09 126/680 |
| 2013/0048582 A1 * | 2/2013 | Kruse | .................... | F24S 30/425 211/41.1 |
| 2015/0236636 A1 * | 8/2015 | Sade | ....................... | H02S 30/10 136/246 |

(Continued)

*Primary Examiner* — Beth A Stephan
(74) *Attorney, Agent, or Firm* — Phillip Mancini

(57) ABSTRACT

A one-piece truss adapter for supporting single-axis trackers with truss foundations. A y-shaped structure has a pair of legs with an angularly adjustable connector for securely joining the one-piece adapter to a pair of driven screw anchors at different angular orientations. Each leg terminates in a ball-shaped connector that is received in a socket integral to a driving coupler at the head of each screw anchor. A retaining nut holds the connector in place to complete the angularly adjustable assembly.

17 Claims, 11 Drawing Sheets

(56) References Cited

U.S. PATENT DOCUMENTS

| | | | |
|---|---|---|---|
| 2016/0013751 A1* | 1/2016 | Michotte De Welle | ............... H02S 20/32 136/246 |
| 2016/0118929 A1* | 4/2016 | Krause | ............... F24S 30/425 136/246 |
| 2020/0072505 A1* | 3/2020 | Hudson | ............... F24S 25/65 |
| 2020/0076354 A1* | 3/2020 | West | ............... H02S 20/32 |
| 2020/0116394 A1* | 4/2020 | West | ............... F24S 25/65 |
| 2020/0304060 A1* | 9/2020 | Hudson | ............... F24S 30/425 |

\* cited by examiner

TRUSS FOUNDATION ADAPTERS FOR SINGLE-AXIS TRACKERS

CROSS-REFERENCE TO RELATED APPLICATIONS

This claims priority to U.S. provisional patent application No. 62/869,993 filed on Jul. 2, 2019, titled "Truss foundation adapters for single-axis trackers", the disclosure of which is hereby incorporated by reference in its entirety.

BACKGROUND

Truss foundations have the potential to save steel relative to plumb monopolies because they are able to translate lateral wind loads into axial forces of tension and compression in the legs, and therefore, may be constructed with lighter weight components and embedded to shallower depths. The additional complexity, however, of constructing a multi-component truss may negate some of this advantage. Therefore, to allow A-frame-shaped truss foundations to achieve their full savings potential, the installation process must also be simple. Simplicity, however, must not come at the expense of accuracy. Because a truss constructed from two legs that need to meet at and/or point at a common point in space, it may be necessary to compensate for misalignment of below-ground portions of the truss when connecting the foundational truss components to those that connect to the single-axis tracker. To that end, the various embodiments of the invention provide truss structures that are relative fast and easy to install while still providing angular adjustability between below-ground and above-ground components at their connection points.

DETAILED DESCRIPTION

The following description is intended to convey a thorough understanding of the embodiments described by providing a number of specific embodiments and details involving truss foundations for single-axis trackers. It should be appreciated, however, that the present invention is not limited to these specific embodiments and details, which are exemplary only. It is further understood that one possessing ordinary skill in the art in light of known systems and methods, would appreciate the use of the invention for its intended purposes and benefits in any number of alternative embodiments, depending upon specific design and other needs.

Figure 1:
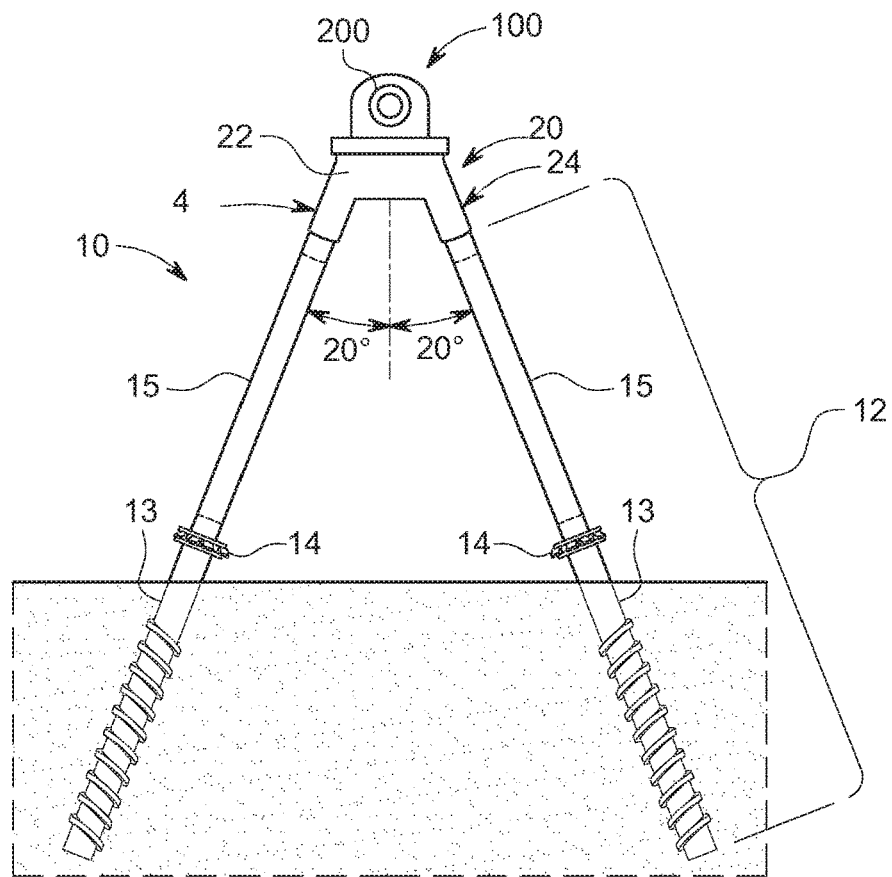
FIG. 1 is a truss foundation supporting a single-axis trackers.

Turning to FIG. 1, this figure shows a truss foundation system 10 for a single-axis tracker that uses a pair of adjacent truss legs 12 extending above and below ground. In this system, a pair of adjacent screw anchors 13 have been driven into underlying ground so that their respective above-ground ends are angled or leaning towards one another. Typically, several of these adjacent screw anchor pairs would be driven along an intended North-South oriented single-axis tracker row. Each screw anchor 13 has a thread form extending from its below ground end along a portion of its length and terminates terminate in driving coupler 14 that is splined or otherwise shaped to mate with the head of a rotary driver so that torque and down force can be imparted to it during driving. Then, a pair of upper legs 15 are joined to screw anchors 13 via couplers 14. In this exemplary system, adapter 20 joins the free ends of each upper leg 15.

As shown, adapter 20 has a main body portion 22 and a pair of connecting portions 24. In various embodiments, connecting portions 24 may consist of tubular portions having a smaller outside diameter than the inside diameter of upper leg sections 15 so that they can be inserted into the open end of respective ones of upper legs 15 to make rigid A-frame-shaped truss foundation structure 10. Single-axis tracker bearing assembly 100 sits on and is attached to main body portion 22 of truss adapter 20. Bearing assembly 100 includes a circular bearing that receives torque tube 200. In various embodiments, anchors 13, upper legs 15 and connecting portions 24 are oriented so that the truss legs are separated by an angle in a range of 35-degrees up to 80-degrees corresponding to truss leg angles of 72.5 degrees down to 50-degrees. Crimp joints may be used to secure upper legs 15 to driving coupler 14 and to connecting portions 24 of adapter 20.

As discussed in the background, truss foundations are advantageous relative to monopiles because they translate lateral wind loads into axial forces of tension and compression rather than bending. Because individual structural members are good at resisting axial loads relative to their ability to resist bending, smaller foundation components may be used to support the same tracker. In the system shown in FIG. 1, it is important that screw anchors 13 are properly oriented when driven so that adapter 20 can support bearing assembly 100 at the correct orientation and position to receive torque tube 200. Although having two-piece legs allows for adjustability at the interface between anchors 13 and upper legs 15 as well as between the upper legs 13 and adapter 20, it also adds time and complexity to the installation. To address this issue, various embodiments replace the two-piece truss legs and adapter with a single pair of screw anchors 13 and universal adapter that combines the functionality of the upper legs 13 and adapter 15 shown in FIG. 1. This is seen, for example, in FIG. 2A.

Figure 2A:
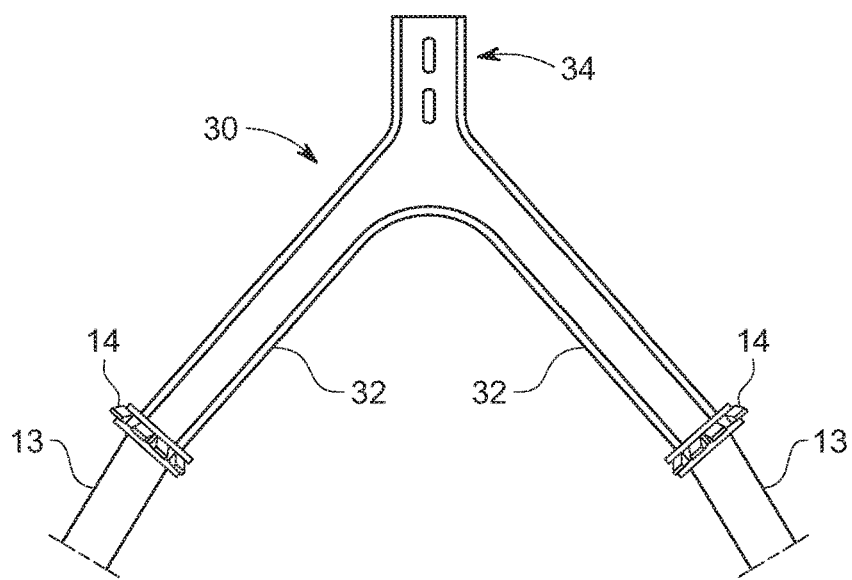
FIG. 2A is a front view of a Y-shaped truss adapter for single-axis trackers according to various embodiments of the invention.

FIG. 2A is a front view of a generic, universal Y-shaped adapter 30 for use with a truss foundation according to various embodiments of the invention. Adapter 30 may be cast, stamped, or welded. It has central mounting portion 34 and legs 32 extending away from mounting portion 34 that are generally symmetric about a midline through central mounting portion 34. Mounting portion 34 may have two or more slots formed in the web region between flanges and may also have one or slots formed in the opposing flanges on either side the web region, though not visible in the front view of 2A. In various embodiments, legs portions 32 are joined to screw anchors 13 via driving couplers 14. Driving couplers 14 may be attached to above-ground ends of screw anchors 13 to provide an interface for a rotary driver as well as mechanism to attach adapter 30. In various embodiments, leg portions 32 may terminate in tubular coupler portions as with adapter 20 shown in FIG. 1.

Figure 2B:
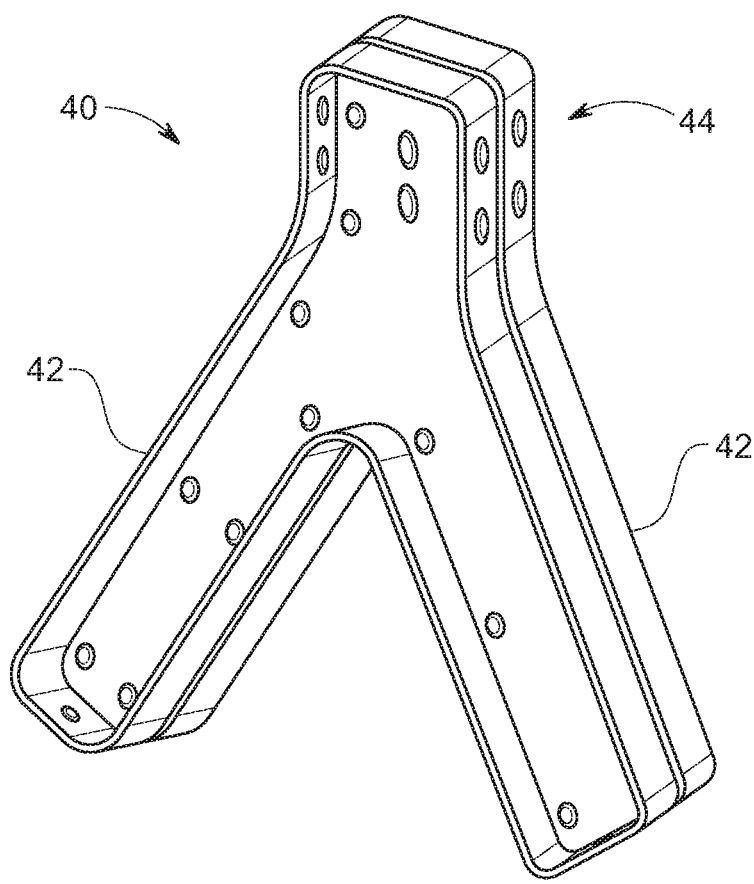
FIG. 2B is a perspective view of another Y-shaped truss adapter for single-axis trackers according to various embodiments of the invention.
Figure 2C:
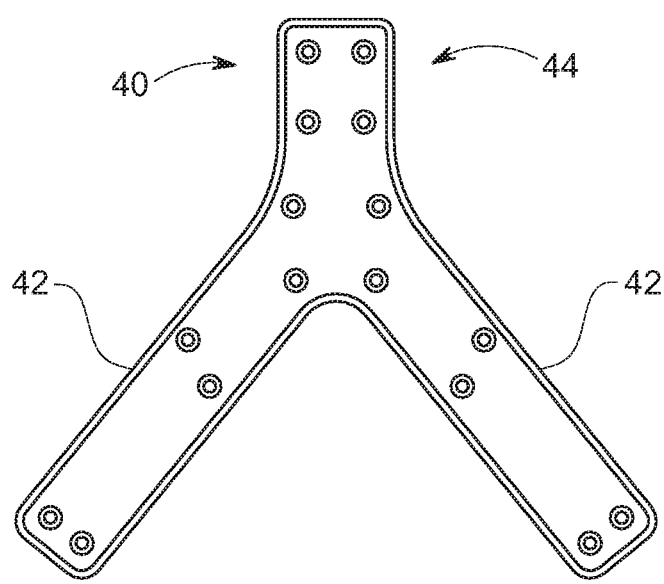
FIG. 2C is a front view of the Y-shaped truss adapter of 2B.

FIG. 2B is a perspective view of another universal Y-shaped adapter 40 according to various embodiments of the invention. Adapter 40 is also shown as being formed from a pair of Y-shaped sections re either spot welded or bolted together so that they have substantially the same geometry on either side, however, the specific construction is a design choice. Y-shaped adapter 40 also has central mounting portion 44 and leg portions 42 that extend downward and away from central mounting portion 44. Opposing flanges circumscribe the entire body to provide stiffness as well as a mounting surface for flange-mounted tracker components. In various embodiments, mounting holes may pass through the web of the central mounting portion 44. Additionally, mounting holes may pass through flanges portions circumscribing mounting portion 44. FIG. 2C is a front view of adapter 40 shown in 2B showing the substantially symmetric geometry.

Figure 3A:
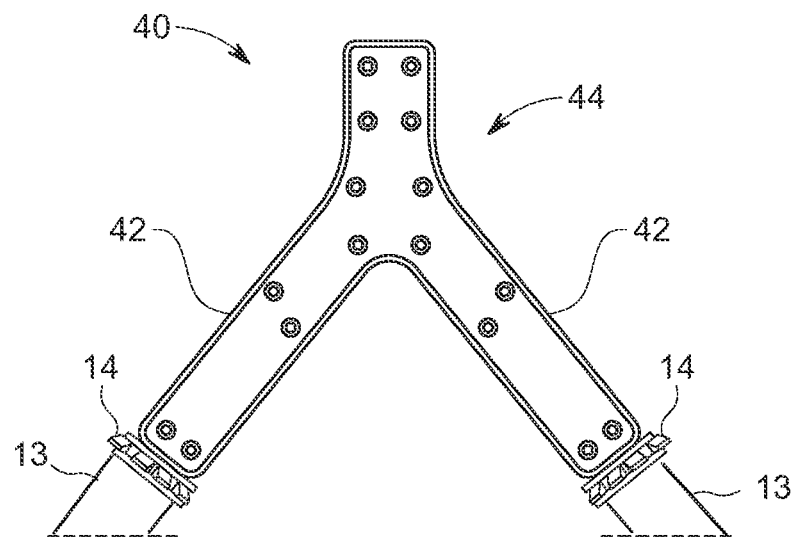
FIGS. 3A and 3B are front views of a Y-shaped truss adapter for single-axis trackers according to various embodiments of the invention set to different heights.
Figure 3B:
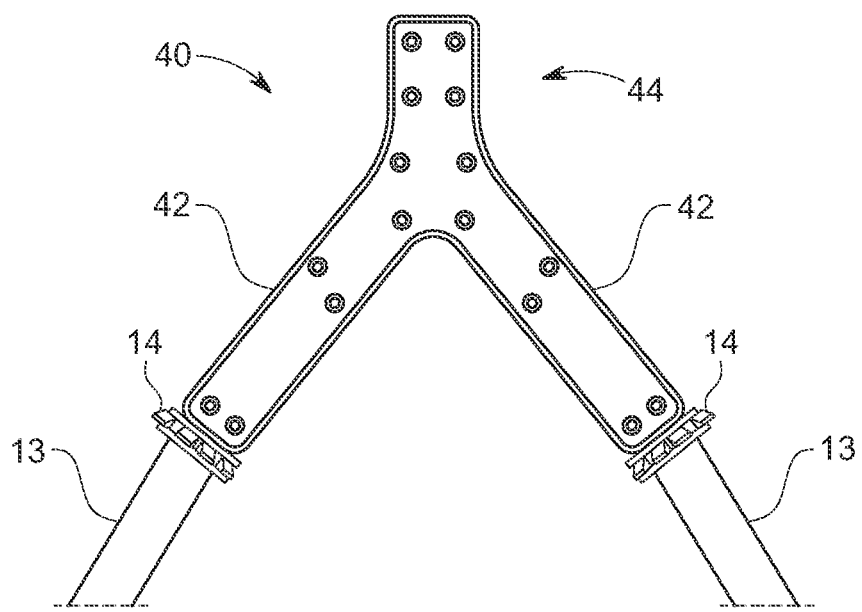

Turning to FIGS. 3A and 3B, these figures show adapter 40 of FIGS. 2B/C attached to screw anchor foundations 13. Starting with 3A, adapter 40 is sitting on screw anchors 13 to present mounting portion at height $H_1$ for the tracker bearing components. Unlike the foundation system shown in FIG. 1, additional above-ground upper legs portions are not needed. Rather, the mounting height is set by the length of screw anchors 13 as well as their depth of the embedment. For a given embedment depth, longer screw anchors may be used to raise the mounting height. For example, FIG. 3B shows the same Y-shaped adapter 40 of 3A set on longer screw anchors 11 that have been driven so that a greater length remains above ground. This will require driving the anchors into the ground at a greater distance apart so that the straight-line distance between their terminal above-ground ends remains the same. In this case, the resultant mounting height is raised to $H_2$, a distance greater than $H_1$.

Figure 4:
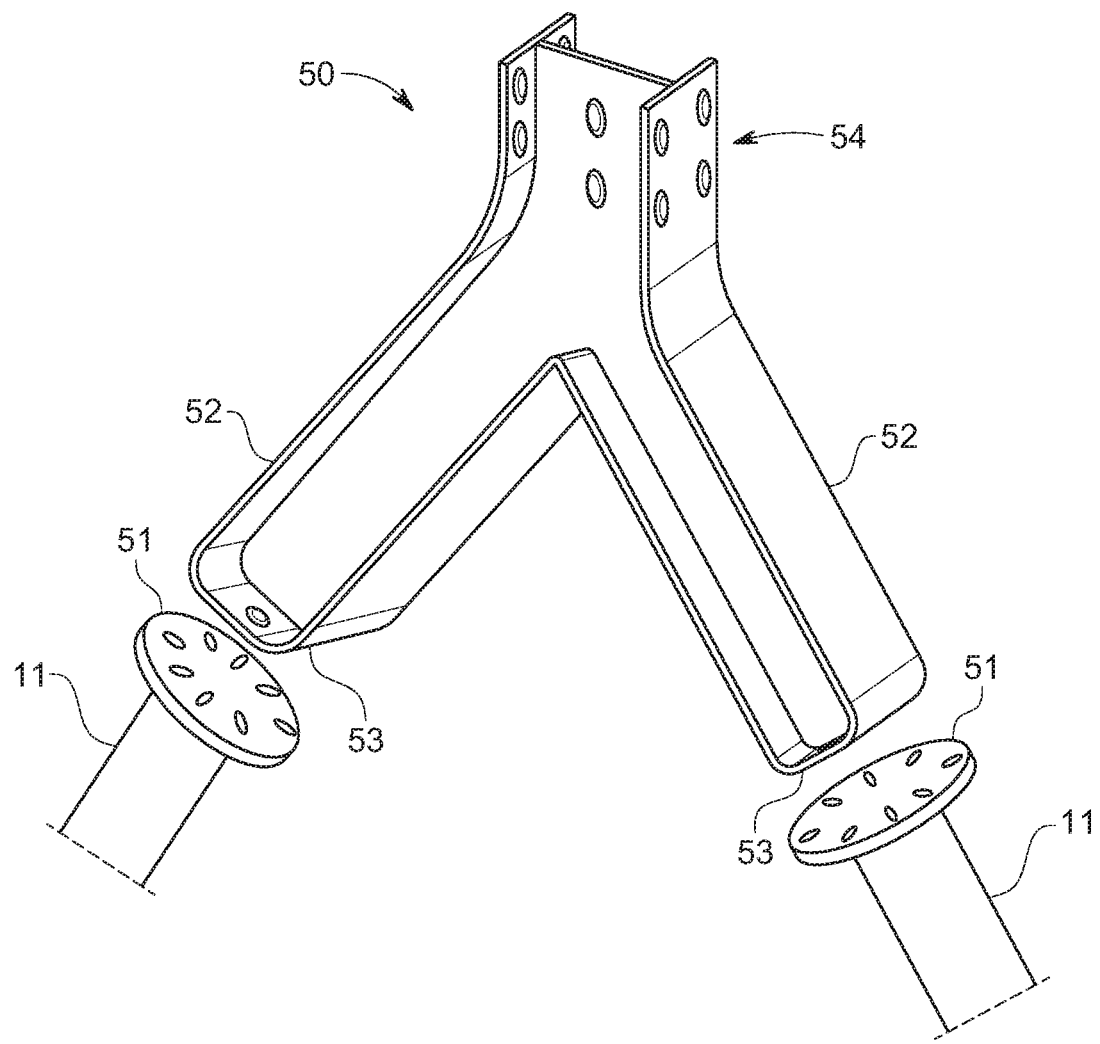
FIG. 4 is a perspective view of another Y-shaped truss adapter for single-axis trackers according to various embodiments of the invention.

FIG. 4 shows another Y-shaped universal adapter 50 according to various embodiments of the invention. Rather than having a continuous flange circumscribing its outer edge, adapter 50 presents an H-pile like geometry at its central mounting portion 54. Central mounting portion 54 includes preformed slots in the web and flange portions for attaching to various bearing assemblies of single-axis trackers. The distal end of each leg portion 52 includes flanges to create a larger surface area to mount to mounting plate 51 attached to the end of each screw anchor 11. In various embodiments, plates 51 may be used instead of driving couplers 14 shown in FIG. 1. In such cases, the rotary driver used to drive screw anchors 11 into the ground may have a set of projections that fit within openings formed in mounting plate 51. In this example, mounting plates 51 have a plurality of mounting slots to ensure that one will line up with corresponding slots and/or openings at the distal end of leg portions 52 of adapter 50.

Figure 5A:
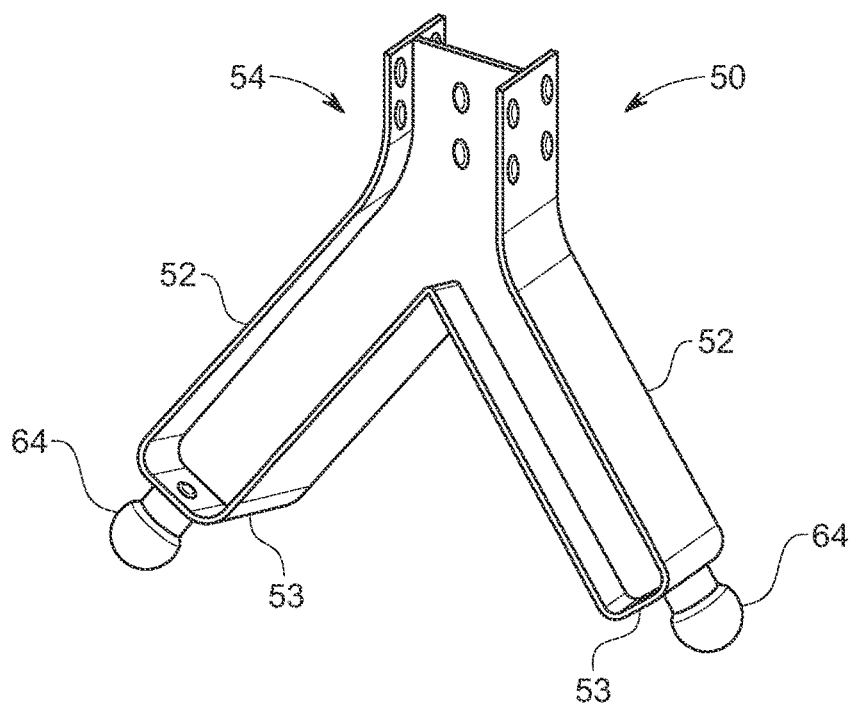
FIG. 5A is a perspective view of the Y-shaped truss adapter of FIG. 4 with adjustable screw anchor coupling assembly according to various embodiments of the invention.
Figure 5B:
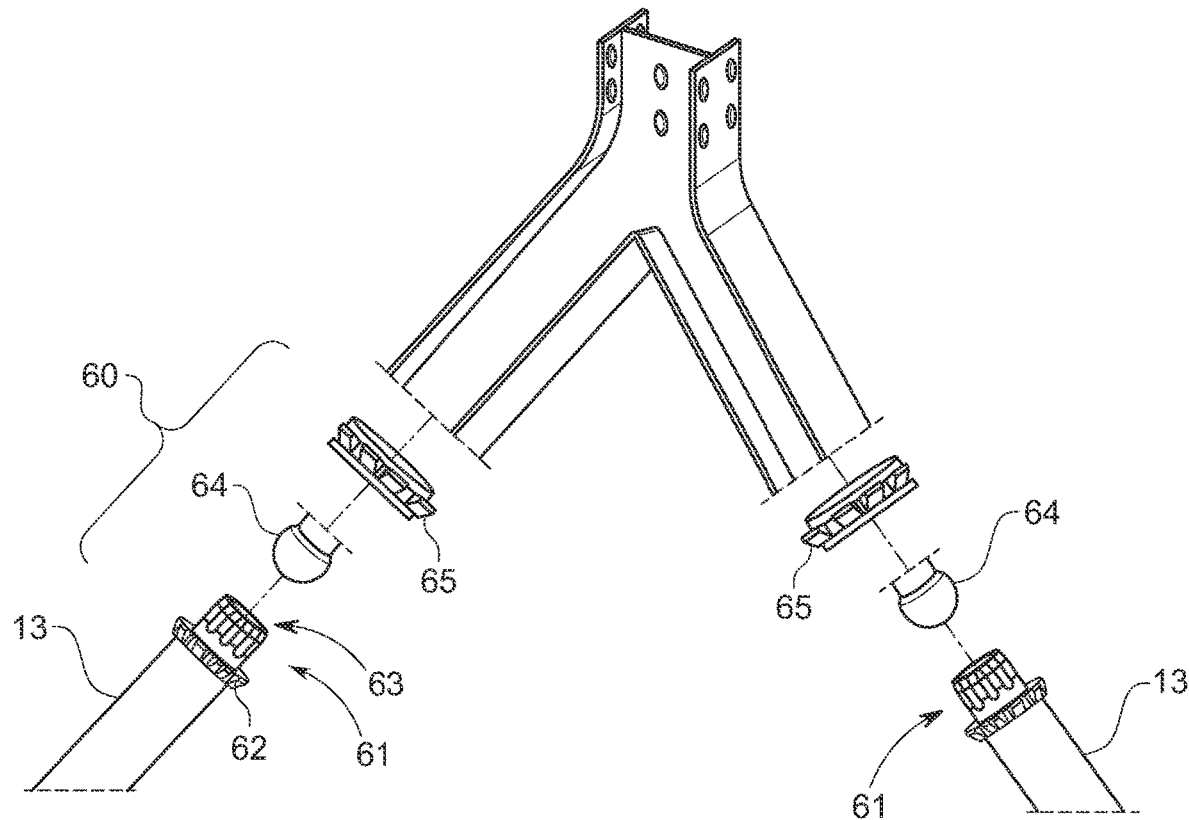
FIG. 5B is a partially exploded view of the adjustable screw anchor coupling assembly of FIG. 5A according to various embodiments of the invention.

Turning now to FIGS. 5A and 5B, like the adapter shown in FIG. 4, these figure show universal Y-shaped adapter 50 that presents an H-pile like geometry at the central mounting 54 with flange and web mounting slots. However, unlike the adapter shown in FIG. 4, this adapter includes ball-shaped connectors 64 that are welded, bolted, or otherwise attached to terminal ends 53 of each leg portion 52. Ball-shaped connectors 64 are designed to fit into reciprocal sockets formed in driving coupler 61 affixed to the end of screw anchors 13. Together, ball-shaped connector 64, coupler 61 and retaining nut 65 make up adjustable coupling assembly 60 that allows angular articulation within the socket, between components.

FIG. 5B shows specific details of a coupling assembly 60 interconnecting leg portions 52 of adapter 50 to screw anchors 13. As shown, the above-ground end of each screw anchor 13 includes coupler 61. Coupler 61 provides a splined tool surface 62 for a rotary driver to selectively engage with to drive anchors 13 into the ground. It also provides a female socket structure 63 to receive ball-shaped connectors 64. Then, retaining nut 65 is torqued down over socket structure 63 and connectors 64 to lock universal Y-shaped adapter 50 to anchors 13 at the desired angular orientation. In various embodiments, female socket structure 63 will have external threads and openings to enable it to expand to receive ball shaped connectors 64 and retract under the compressive pressure of retaining nut 65.

Figure 6A:
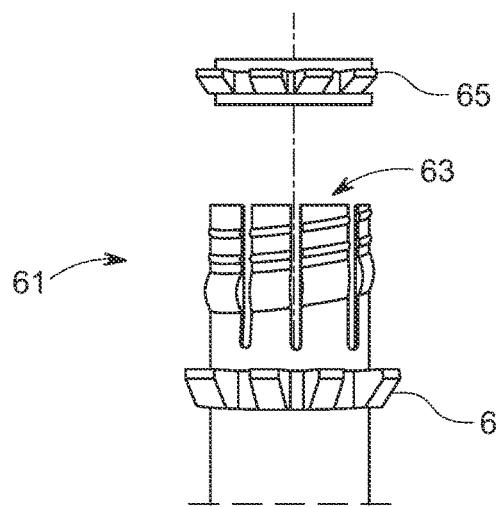
FIGS. 6A-C are various views the screw anchor coupling assembly of FIGS. 5A and 5B according to various embodiments of the invention.
Figure 6B:
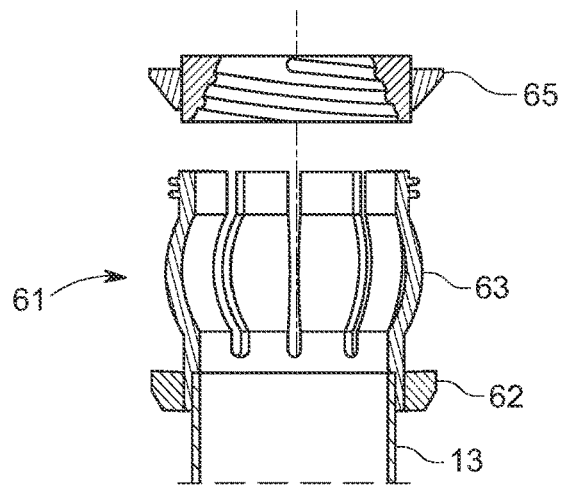
Figure 6C:
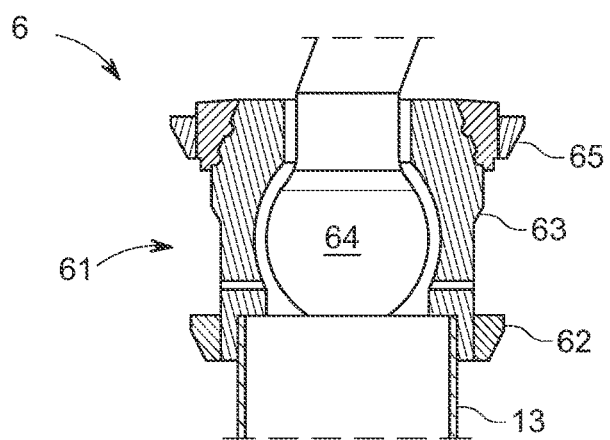

FIGS. 6A/B/C show close-up views of coupling assembly 60 at various stages of engagement. Starting with 6A, this figure is an exploded view of a portion of coupling system 60. As shown, driving coupler 61 includes a series of driving features (splined tool surface 62) that circumscribe the outer surface of the coupler. In various embodiments, coupler 61 is welded or otherwise attached to the end of screw anchor 13. These driving features are positively engaged by a driving head or chuck of a rotary driver to transfer rotational force to the screw anchor to cause it to screw into the ground. After the desired depth has been reached, the rotary driver is backed off, leaving behind the female socket structure 63 of coupler 61. Female socket structure 63 includes several tangs arranged in a tubular pattern projecting upward away from the driving features of tool surface 62. In various embodiments, tangs are formed by cutting slots at regular intervals into the receiving portion 63. Cutting tangs allows the coupler to elastically deform when ball-shaped connector 64 is pressed into the receiving portion, in this example, female socket structure 63. In addition, a positive thread form is stamped otherwise formed in female socket structure 63 on the surface of the tangs using a press or other device to enable retaining nut 65 to be threaded onto female socket structure 63. In various embodiments, retaining nut 65 may have corresponding female threads formed on its inner surface that engage with positive threads on female socket structure 63. Retaining nut 65 may also have driving features circumscribing its outer surface, such as the teeth shown in the figures. It should be appreciated that these teeth may be replaced with six facets like a traditional nut so that a standard wrench may be used to torque it onto the tangs of the receiving portion 63. FIG. 6B shows the inside surfaces of the coupler 61 and retaining nut 65 while FIG. 6C shows ball-shaped connector 64 inserted into female socket structure 63 of coupler 61 with retaining nut 65 threaded on to hold assembly 60 together.

Figure 7A:
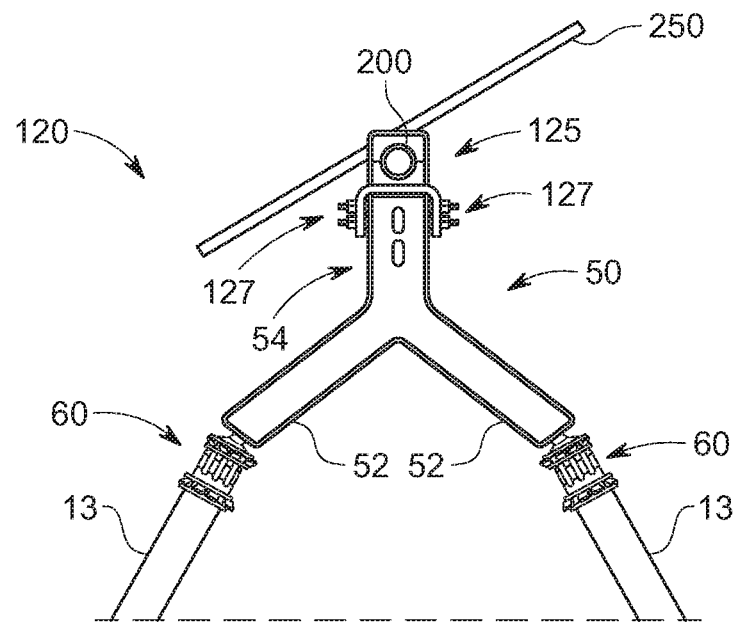
FIG. 7A is a front view of a single axis tracker supported by a Y-shaped truss adapter and truss foundation according to various embodiments of the invention.

Turning to FIGS. 7A and B, these figures shows Y-shaped adapter 50 supporting single-axis tracker 120 with a truss foundation according to various embodiments of the invention. The adapter 50 sits on a pair of screw anchors 13 driven partially into the ground. Screw anchors 13 terminate in respective couplers 61 that receive ball-shaped connectors 64 to form coupling assembly 60 with the end of each leg portion 52 of adapter 50. Leg portions meet at central mounting portion 54 that terminates with a web and opposing flanges. Because adapter 50 presents an H-pile interface at the top, it can support many different third-party bottom-up or top-down style single-axis trackers. In FIG. 7A, a single axis tracker 120 is a bottom-up single-axis tracker, such as that manufactured and sold by Array Technologies, Inc. of Albuquerque, N. Mex., however, other single-axis tracker may be used as well. Tracker 120 includes bearing assembly 125 which includes a bearing that receives torque tube 200. In this tracker, torque tube 200 rotates about its own axis within bearing assembly 125. Bearing assembly 125 is bolted with four bolts 128 passing through pre-drilled holes in flanges 127 that overlap with the flanges formed on mounting portion 54 of adapter 50. Solar panels 250 are attached to the torque tube 200 using torque tube brackets or U-bolts that have been omitted from the figure.

Figure 8A:
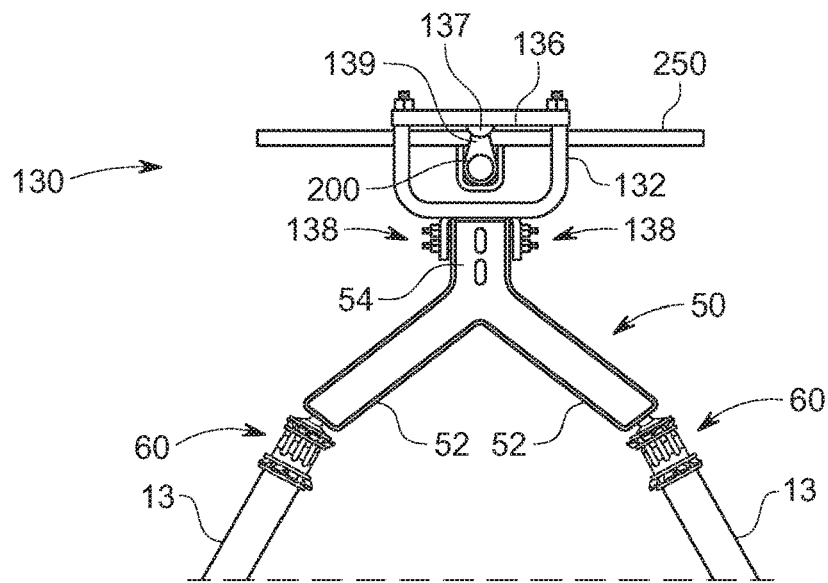
FIG. 8A is a front view of another single-axis tracker supported by a Y-shaped truss adapter and truss foundation according to various embodiments of the invention.
Figure 8B:
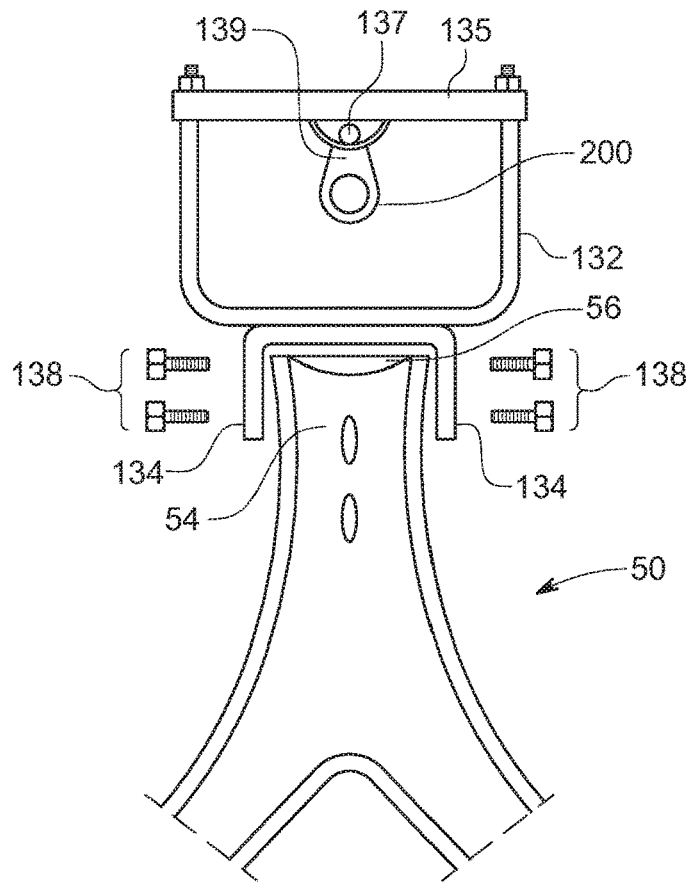
FIG. 8B is a partially exploded close-up view of interface between the single-axis tracker of FIG. 8A and the Y-shaped truss adapter according to various embodiments of the invention.

FIGS. 8A and B show adapter 50 supporting another single-axis tracker 130 according to various embodiments of the invention. Adapter 50 is the same as that shown in FIG. 4. The differences lie in the tracker and related components connected to it. Tracker 130 shown here is top-down design such as that manufactured and sold by NEXTracker, Inc. of Fremont, Calif. In this example, the NEXTracker bearing housing assembly has been replaced with U-shaped bearing support bridge 132. Support bridge 132 has a pair of flanges 134 below it that overlap with the flanges in mounting portion 54 of adapter 50. Bearing plate 135 sits on the top of bearing support bridge 132. Bearing plate 135 includes a central bearing opening 137 that receives a bearing pin from which torque tube 200 is suspended via torque tube bracket 139 to enable it to rotate through an arc as the drive motor moves the torque tube. In various embodiments, flange portions 134 have vertical slots that enable adjustment of the rotational axis height in the Z-direction (elevation above ground). Bearing plate 135 may also have a pair of slots formed in it allowing for adjustment in either the X or Y-directions (North-South or East-West) relative to support bridge 132. As shown, a pair of bolts project upward out of the U-shaped bearing support bridge 132 on either side of the arc.

Figure 7B:
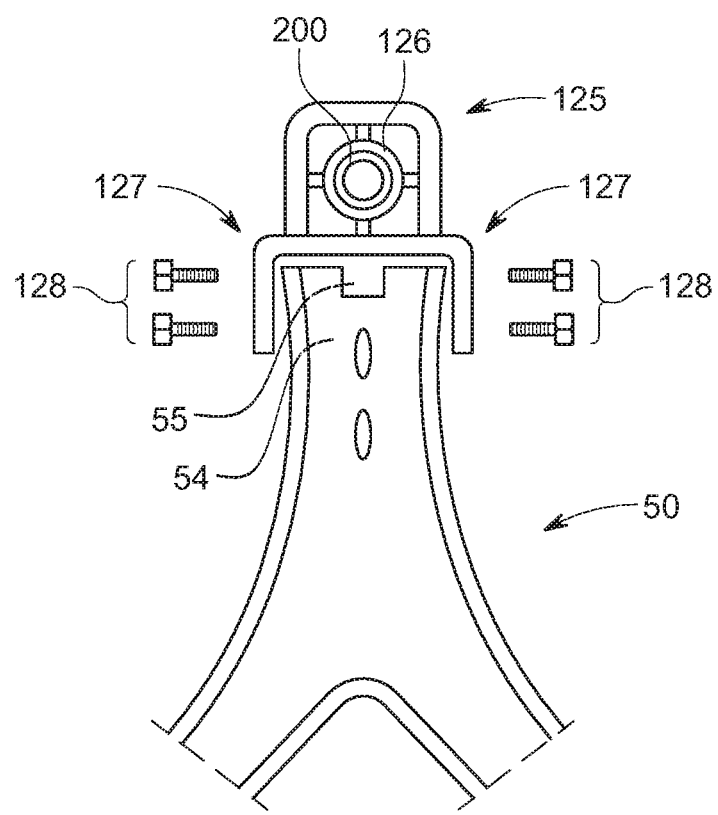
FIG. 7B is a partially exploded close-up view of interface between the single-axis tracker of FIG. 7A and Y-shaped truss adapter according to various embodiments of the invention.

With either monopile or truss foundations, one problem that must be solved at each foundation location along the torque tube is bearing alignment in the Z or vertical direction with respect to the other bearings in the row and/or with respect to an intended bearing height. Vertical adjustment ability is usually provided via slots in either the foundation flanges or web or in the bearing components that are attached to them. However, these components must still be elevated in order to take advantage of this adjustability. To that end, adapter 50 shown in FIG. 7B has been modified to incorporate notch 55 in top portion 54 of adapter 50. Notch 55 allows insertion of a pry bar or other tool that can be used to elevate the bearing assembly 125 in the Z-direction while keeping it oriented in X and Y-directions, with or without the torque tube in the bearing, to achieve alignment. Once the alignment has been achieved, another worker may tighten down the bolts 128 so that bearing assembly 125 remains at the correct elevation relative to the foundation—in this case, adapter 50. Similarly, in FIG. 10B, adapter 50 has been modified to include a semi-concave opening 56 at the top of the web in support portion 54 to allow the same. Semi-concave opening 56 may also allow temporary placement of torque tube 200 or torque tube sections so that the bearing components such as bridge 132 can be attached while it is elevated above-ground rather than working down at ground level.

Figure 9:
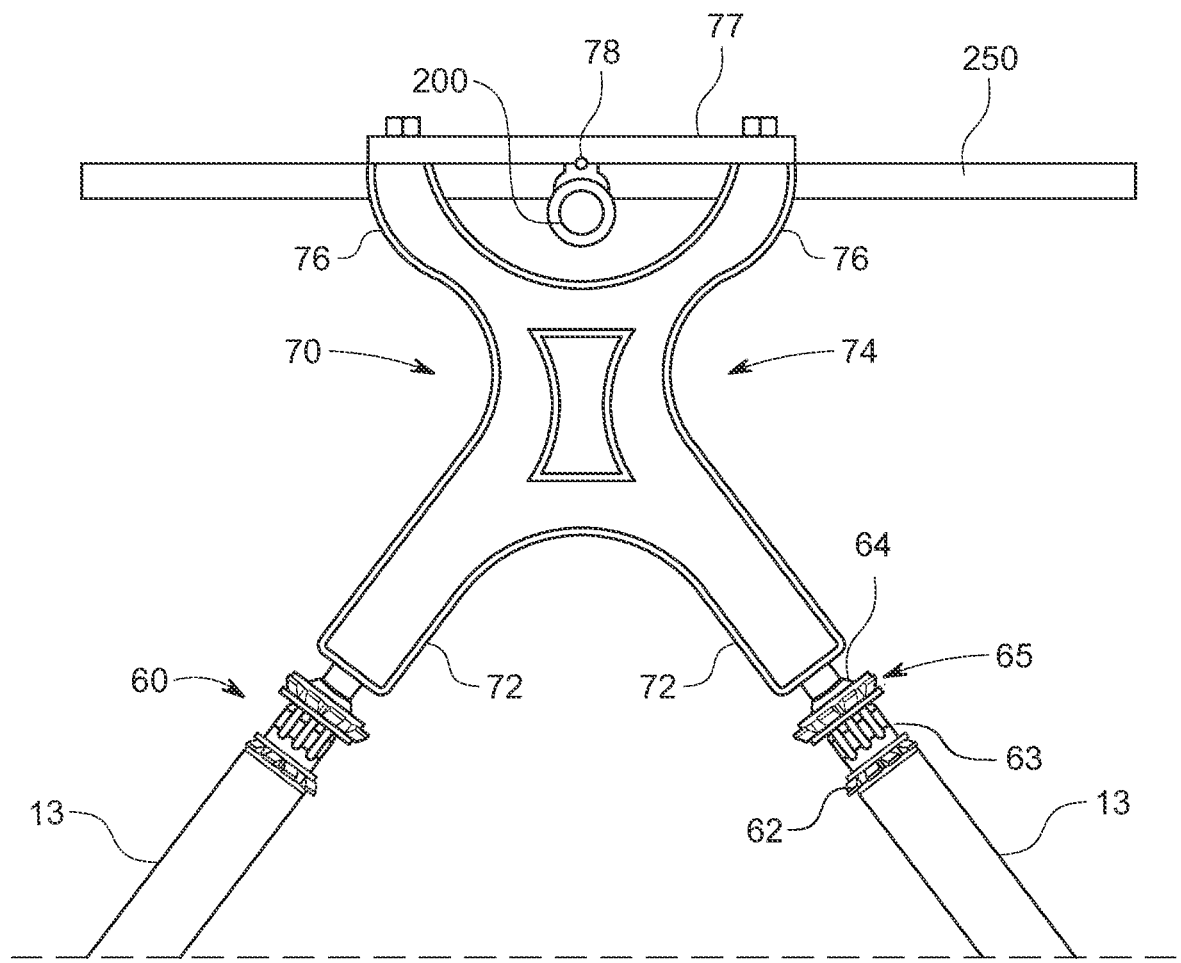
FIG. 9 is a front view of another single-axis tracker and double-Y-shaped bearing adapter and truss foundation according to various embodiments of the invention.

FIG. 9 shows another adapter 70 for supporting a top-down single-axis tracker according to various embodiments of the invention. Adapter 70 has a pair of leg portions 72, middle portion 74, and pair of arms 76. As with adapters 50 and 60, leg portions 72 terminate in ball-shaped connectors 64 that are received within receiving portions 62 of couplers 61 attached to the above-ground end of respective screw anchors 11. Retaining nuts 65 trap ball-shaped connectors 64 within receiving portions 62 of couplers 61 to form assembly 60.

Adapter 70 also has a pair of arms 76 extending generally opposite to leg portions 72 from middle portion 74. Arms 76 provide an elevated, flat mounting surface for bearing plate 77 to sit on. Bearing plate 77 may be the same as bearing plate 135 in FIGS. 8A and B or may be different depending on the geometry of arms 76. Bearing plate 77 has a bearing opening 78 that receives a bearing pin from which torque tube 200 is hung. As shown, a pair of bolts are received in or extend out of the top of each arm 76 after passing through holes or slots in bearing plate 77. Arms 76 are spread apart and oriented to provide clearance for torque tube 200 to swing from East to West to keep panels 250 oriented normal to the sun. Adapter 70 may be formed from stamped and/or welded construction. It could be made from a single piece or two identical pieces joined together, such as, for example, with adapter 40 in FIG. 2B.

Figure 10A:
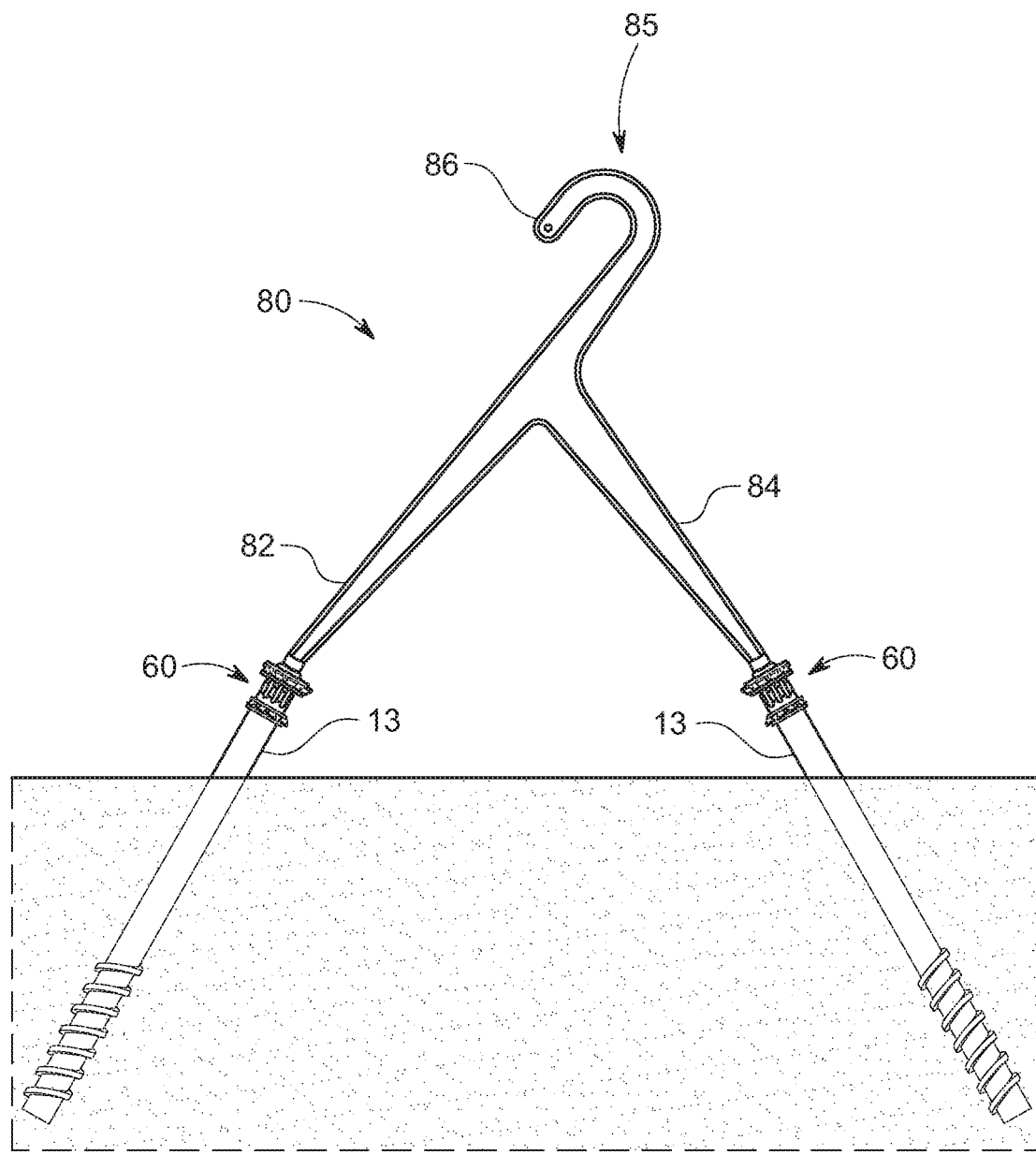
FIGS. 10A and 10B show front views of respective asymmetrical Y-shaped truss adapters for supporting single-axis trackers according to various embodiments of the invention.

Turning now to FIGS. 10A and B, these figures show two more Y-shaped adapters 80, 90 respectively, for supporting a top-down style of tracker according to various embodiments of the invention. Starting with adapter 80 shown in FIG. 11A, this adapter has short leg 84, long leg 82 and curved bearing support 85 with integral bearing 86. Although adapter 80 has an asymmetric geometry, bearing 86 is centrally located along the midline of the adapter. Adapter 80 connects to respective screw anchors 13 via assembly 60, in the same manner as that described in the context of the other adapters disclosed herein. In various embodiments, it may be necessary to alternate the orientation of adapters along a single torque tube row so that some of the curved bearing support portions 85 face East and others face West. This will enable curved support portions 85 to function as a rotational stop for the suspended torque tube.

Figure 10B:
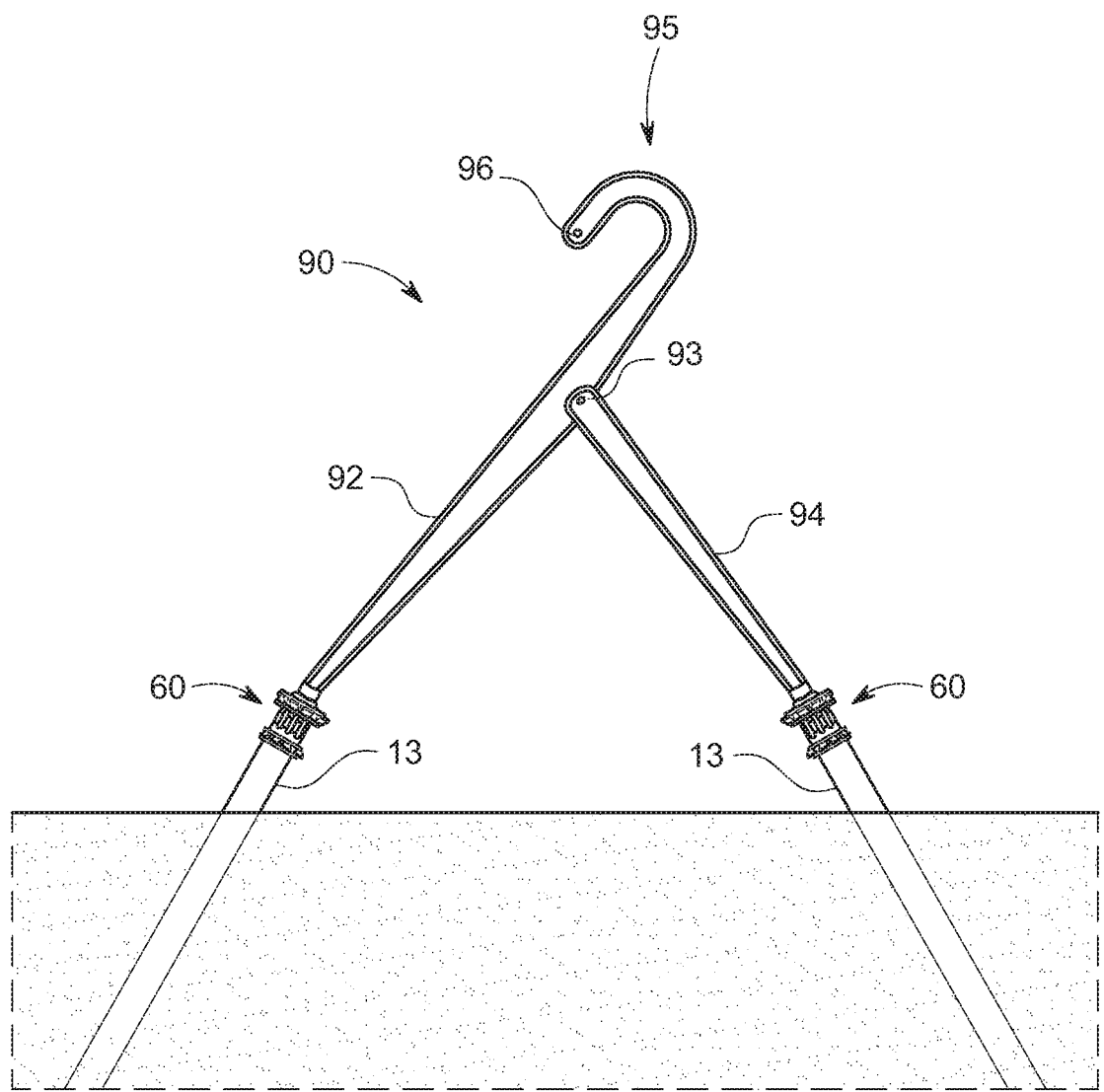

Adapter 90 of FIG. 10B is similar to adapter 80 with short leg 94, long leg 92, curved bearing support portion 95 and bearing 96. Short leg 94 is hinged to long leg 92 at hinge point 93 to enable adapter 90 to compensate for misalignment of the screw anchors 13 during driving as well as to accommodate different leg angles (e.g., 60-degree, 70-degrees, etc.) and terrain variations. This, combined with the adjustability afforded by connector assembly 60, will provide several degrees of angular adjustment so that bearing 96 can be aligned with the other bearings in the same row (i.e., along the same torque tube).

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A foundation system for single-axis trackers comprising:
   a pair of elongated screw anchors, each of the anchors having a first threaded end and an opposing driving end, the driving end comprising a driving coupler having a first portion for engagement with a rotary driver and a second connecting portion; and
   a Y-shaped truss adapter, the Y-shaped truss adapter having a pair of legs and a bearing support portion at an opposing end, wherein each of the legs is adapted to connect to one of the second connecting portions.

2. The foundation system according to claim 1, wherein each leg of the pair terminates in an adjustable connector adapted to mate with one of the second connecting portions of one of the driving couplers so as to permit angular adjustment between the screw anchor and the second connecting portion.

3. The foundation system according to claim 2, wherein the adjustable connector comprises a ball-shaped connector and the second connecting portion of the driving coupler comprises a socket adapted to receive the ball-shaped connector.

4. The foundation system according to claim 3, further comprising a retaining nut above the ball-shaped connector, adapted to thread over the socket, thereby compressing the socket around the ball-shaped connector.

5. The foundation system according to claim 1, wherein the bearing support portion comprises a pair of vertically oriented opposing flanges interconnected by a web.

6. The foundation system according to claim 1, wherein the bearing support portion comprises a pair of arms extending outwardly and away from said legs.

7. The foundation system according to claim 6, further comprising a bearing plate, the bearing plate attached to a distal end of each arm of the pair of arms and having a bearing for receiving a rotating member.

8. The foundation system according to claim 1, wherein the bearing support portion comprises a bearing support bridge with a bearing plate attached to the support bridge and having a bearing for receiving a rotating member.

9. An assembly comprising:
   a truss adapter having a main body and a pair of leg portions, each of the leg portions terminating in a connector;
   a pair of elongated foundation members, each of the foundation members having a threaded end and an opposing driving end, the driving end terminating in a driving coupler; and
   a pair of retaining nuts, each of the nuts adapted to compress a portion of one of the driving couplers around one of the connectors to join one of the leg portions to one of the driving couplers.

10. The assembly according to claim 9, wherein each of the connectors comprises a ball-shaped connector.

11. The assembly according to claim 10, wherein each of the driving couplers comprises a driving portion and a receiving portion, the receiving portion comprising a socket for receiving one of the ball-shaped and an external thread form for engaging threads of one of the retaining nuts.

12. The assembly according to claim 11, wherein the ball-shaped connector and the socket enable the truss adapter to connect to the screw anchor at a plurality of different angles.

13. A Y-shaped adapter for a truss foundation system, comprising:
   a bearing support portion; and
   a pair of leg portions extending down and away from the bearing support portion, each of the leg portions terminating in an angularly adjustable ball-shaped connecting portion for connecting to a driving coupler of a screw anchor.

14. The Y-shaped adapter according to claim 13, wherein the bearing support portion comprises a bearing support bridge.

15. The Y-shaped adapter according to claim 13, wherein the bearing support portion comprises a pair of arms.

16. The Y-shaped adapter according to claim 13, wherein the bearing support portion comprises a pair of flanges interconnected by a web.

17. The Y-shaped adapter according to claim 13, further comprising a retaining nut between the leg portion and ball-shaped connecting portion for retaining the ball-shaped connecting portion within the driving coupler of the screw anchor.

* * * * *